United States Patent
Döffinger et al.

(10) Patent No.: US 10,791,332 B2
(45) Date of Patent: Sep. 29, 2020

(54) VIDEO DATA PROCESSING SYSTEM

(71) Applicant: ARM Limited, Cambridge (GB)

(72) Inventors: Reimar Gisbert Döffinger, Lund (SE); Thomas Nyberg, Lund (SE)

(73) Assignee: Arm Limited, Cambridge (GB)

(*) Notice: Subject to any disclaimer, the term of this patent is extended or adjusted under 35 U.S.C. 154(b) by 141 days.

(21) Appl. No.: 14/949,651

(22) Filed: Nov. 23, 2015

(65) Prior Publication Data

US 2016/0191937 A1    Jun. 30, 2016

(30) Foreign Application Priority Data

Dec. 12, 2014 (GB) .................................. 1422132.9

(51) Int. Cl.
| | |
|---|---|
| *H04N 19/174* | (2014.01) |
| *H04N 19/124* | (2014.01) |
| *H04N 19/196* | (2014.01) |
| *H04N 19/463* | (2014.01) |
| *H04N 19/176* | (2014.01) |
| *H04N 19/132* | (2014.01) |

(52) U.S. Cl.
CPC ......... *H04N 19/174* (2014.11); *H04N 19/124* (2014.11); *H04N 19/132* (2014.11); *H04N 19/176* (2014.11); *H04N 19/196* (2014.11); *H04N 19/463* (2014.11)

(58) Field of Classification Search
CPC .... H04N 19/46; H04N 19/119; H04N 19/124; H04N 19/196; H04N 19/174; H04N 19/70; H04N 19/51
USPC .................................................. 375/240.24
See application file for complete search history.

(56) References Cited

U.S. PATENT DOCUMENTS

| | | | |
|---|---|---|---|
| 2006/0256867 A1 | 11/2006 | Turaga | |
| 2008/0165861 A1* | 7/2008 | Wen ..................... | H04N 19/139 |
| | | | 375/240.26 |

(Continued)

FOREIGN PATENT DOCUMENTS

| | | |
|---|---|---|
| CN | 102611892 | 7/2012 |
| JP | 2009267440 A | 11/2009 |

(Continued)

OTHER PUBLICATIONS

GB Search Report dated May 27, 2015, GB Patent Application No. GB1422132.9.

(Continued)

*Primary Examiner* — On S Mung
(74) *Attorney, Agent, or Firm* — Vierra Magen Marcus LLP

(57) ABSTRACT

The technology described herein facilitates parallel encoding of two groups of blocks of data of a sequence of blocks of data, whilst also facilitating the use of dependent encoding across the sequence of data blocks. This is achieved by allocating pairs of first and second groups of data blocks to separate encoding units, and determining an encoding parameter value to be used for encoding the first block of each second group of data blocks. For correct reconstruction of the image, it is ensured that a block belonging to the first group of data blocks of a pair of groups of data blocks is encoded with an encoding parameter value that will cause a decoder to use the determined encoding parameter value when decoding the first block of the second group.

18 Claims, 6 Drawing Sheets

(56) References Cited

U.S. PATENT DOCUMENTS

| | | | | |
|---|---|---|---|---|
| 2012/0128064 A1* | 5/2012 | Sato | ........................ | H04N 19/13 |
| | | | | 375/240.03 |
| 2012/0213448 A1* | 8/2012 | Malmborg | ............. | H04N 19/60 |
| | | | | 382/234 |

FOREIGN PATENT DOCUMENTS

| | | |
|---|---|---|
| JP | 2010035146 A | 12/2010 |
| WO | 2009150808 A1 | 12/2009 |

OTHER PUBLICATIONS

Joint Collaborative Team on Video Coding of ITU-T SGI 6 WP3 and ISO/IEC, Clare et al. JTC1/SC29/WG11, 6th Meeting Torino, IT, Jul. 14-22, 2011, Available from: http://phenix.intevry.fr/jct/doc end user/current document.php?id=2740.

Optimal Frame Skipping for H.263+ Video Encoding, Giovanni Matta, James A. Storer, Computer Science Department, Brandeis University, Waltham, MA-02454, USA, and Bruno Carpentieri, Dip. di Informatica ed App. "R.M. Capocelli", Universita' di Salerno, 84081 Baronissi (SA), Italy.

Computational Complexity Management of a Real-Time H.264/AVC Encoder, C S Kannangara, I E Richardson and A J Miller.

Chinese Office Action and Search Report dated Aug. 21, 2019, Chinese Patent Application No. 201510924558.3.

JP 2015-241948, Office Action dated Nov. 14, 2019, 17 pages.

Chinese Office Action dated Jul. 1, 2020, Chinese Patent Application No. 2015109245583.

UK Examination Report dated Nov. 30, 2020, UK Patent Application No. GB1422132.9.

\* cited by examiner

Row 1

| 1 | 0 | 1 | 3 | 5 | 7 | 9 | 11 |

Row 2

| 2 | 2 | 4 | 6 | 8 | 10 | 12 | ... |

FIG. 3

VIDEO DATA PROCESSING SYSTEM

BACKGROUND

The technology described herein relates to the processing of video data. More particularly, this technology described herein relates to a method of and apparatus for encoding video image data.

It is known in the art to encode video image data (e.g. RGB or YUV values) according to a predetermined video encoding format, such as those formats defined by the Moving Picture Experts Group (commonly referred to generically as the MPEG format). Video encoding formats such as MPEG can enable a significant reduction in the file size of video image data without significant visible loss of image quality.

As is known in the art, generally, in encoded video data, each video frame is divided into a plurality of blocks of pixels of the frame (e.g. 16×16 pixel blocks in the case of MPEG encoding) and each block is encoded individually.

In video encoding standards such as MPEG, H.264, and the like, each block of pixels (e.g. 16×16 pixel blocks in the case of MPEG encoding) within the video image data is usually encoded with respect to previously encoded data, e.g. a reference block, either from the current frame (e.g. a previously encoded block of pixels in the current frame) or from a previous frame (e.g. a corresponding encoded block of pixels in a previous frame). Each data block would therefore usually comprise a vector value (the so-called "motion vector") pointing to the previously encoded data, and data (the "residual") describing the differences between the current data block and the previously encoded data. (This thereby allows the video data for the area of the (current) frame to be constructed from encoded video data pointed to by the motion vector and the difference data describing the differences between that area and the area of the current video frame.)

The data block may then be encoded by, for example, transforming the residuals into a set of coefficients (e.g. using an approximate Discrete Cosine Transform (DCT)) which are then quantized. The quantization step typically involves dividing each coefficient value by an integer value, and then restricting the result to one of a limited set of values.

The extent of quantization, and hence the amount of compression achieved when encoding the data, is regulated by a quantization parameter (QP). The quantization parameter is typically an index used to indicate a scaling matrix to be used during the quantization step. The quantization parameter may be selected and set by the encoder based on, e.g., the desired bit rate and complexity of the data to be encoded.

In order to enable the decoder to reconstruct the original video image data from the encoded data (as accurately as possible), the QP values used to quantize the coefficients representing the original video image data during the encoding process must be indicated to the decoder. In many systems, this is done by including in the encoded data blocks information indicating, inter alia, the QP value used to encode the data block in question.

The QP values may be encoded as absolute values. However, usually the QP value for a given block is dependently encoded, i.e. the QP value for the block is defined as a relative value with respect to a preceding block (typically in raster scan order), normally with respect to the QP value indicated for the preceding block. This is advantageous in that, where the difference to be encoded is relatively small, a data size reduction, i.e. a reduction of the memory required to store the QP value, can be achieved.

It is also known in the art to parallelize data processing tasks which comprise multiple sub-tasks. For example, it is known to divide a typical encoding process between several encoding units by allocating separate groups of unencoded blocks of pixels between the units. If the groups can be encoded in parallel by the multiple encoding units, this parallelization of the encoding process can mean that the time required for it to be carried out can be greatly reduced by virtue of the multiple encoding units operating in parallel to one another.

However, video encoding formats in which quantization parameter (QP) values for blocks of data are encoded relative to the values of preceding blocks of data (in the traditional raster scan order) are not easily adapted to such parallelization since the encoding is by its nature sequential, as each block in a sequence of blocks requires a previous block (particularly the QP value of the preceding block) to be encoded in order to be encoded itself in dependence thereon.

Accordingly, it would be desirable to provide an improved technique for encoding video image data, wherein the above described data size reduction advantages of dependent QP encoding, and the above described advantages of data processing parallelization, could both be realised.

BRIEF DESCRIPTION OF THE DRAWINGS

A number of embodiments of the technology described herein will now be described by way of example only and with reference to the accompanying drawings, in which:

FIG. 3 schematically illustrates how two rows of an image may be allocated to separate encoding units that will operate in parallel with one another;

Like reference numerals are used for like features throughout the drawings, where appropriate.

DETAILED DESCRIPTION

Figure 1:
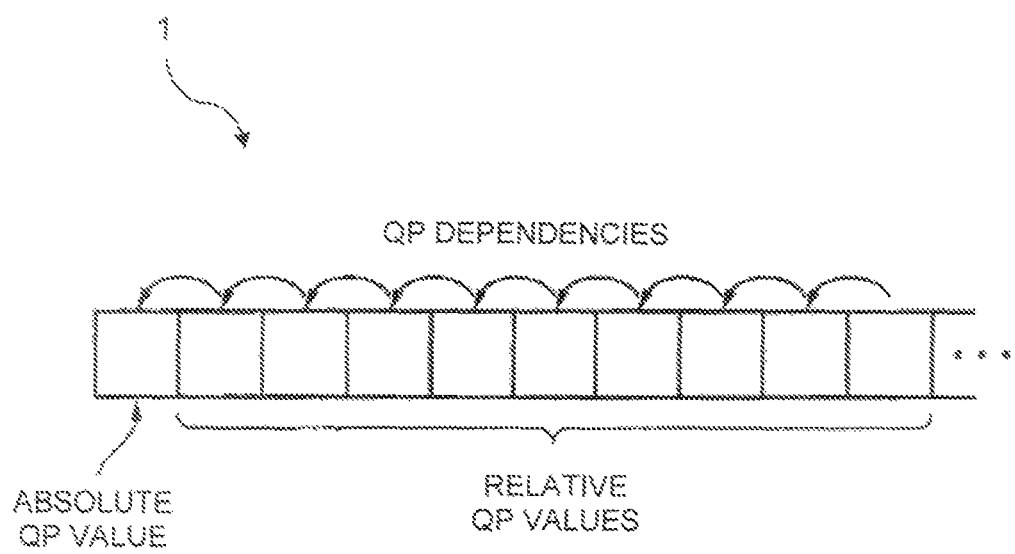
FIG. 1 schematically illustrates a sequence of encoded blocks of pixels in MPEG format wherein many encoded blocks include relative QP values.

A first embodiment of the technology described herein comprises a method of encoding video image data comprising encoding a sequence of unencoded blocks of the video image data into a sequence of encoded blocks of data in a video encoding format, wherein:

the video encoding format uses an encoding parameter when encoding unencoded blocks of data;

the method comprising, for at least one pair of a first and a second group of unencoded blocks of data of the sequence of unencoded blocks of data, the first and second groups comprising contiguous blocks of data in the bitstream order of the video image data, the first block of the second group following the last block of the first group in the bitstream order:

encoding the first and second groups of unencoded blocks of data to generate a first group and a second group of encoded blocks of data, respectively;

wherein the encoding of the first and second group of unencoded blocks of data comprises:

determining a value of the encoding parameter to be used for encoding an unencoded block of data in the second group, before the encoding of all of the blocks of data in the first group has finished;

encoding the unencoded block of data in the second group using the determined encoding parameter value; and ensuring that an encoded block of data in the first group indicates an encoding parameter value that will cause a decoder to derive the determined encoding parameter value for the encoded block of data in the second group when using the indicated encoding parameter value for the encoded block of data in the first group to determine the encoding parameter value to use for decoding the block of data in the second group.

A second embodiment of the technology described herein comprises an apparatus for encoding video image data, wherein encoding video image data comprises encoding a sequence of unencoded blocks of the video image data into a sequence of encoded blocks of data in a video encoding format, wherein:

the video encoding format uses an encoding parameter when encoding unencoded blocks of data;

the apparatus for encoding video image data comprising processing circuitry configured to, for at least one pair of a first and a second group of unencoded blocks of data of the sequence of unencoded blocks of data, the first and second groups comprising contiguous blocks of data in the bitstream order of the video image data, the first block of the second group following the last block of the first group in the bitstream order:

encode the first and second groups of unencoded blocks of data to generate a first group and a second group of encoded blocks of data, respectively;

wherein the encoding of the first and second group of unencoded blocks of data comprises:

determining a value of the encoding parameter to be used for encoding an unencoded block of data in the second group, before the encoding of all of the blocks of data in the first group has finished;

encoding the unencoded block of data in the second group using the determined encoding parameter value; and ensuring that an encoded block of data in the first group indicates an encoding parameter value that will cause a decoder to derive the determined encoding parameter value for the encoded block of data in the second group when using the indicated encoding parameter value for the encoded block of data in the first group to determine the encoding parameter value to use for decoding the block of data in the second group.

The technology described herein relates to a method of and apparatus for encoding video image data which can facilitate dependent encoding and data processing parallelization.

The video image data to be encoded comprises a sequence of unencoded blocks of data.

The video encoding format used is one in which an encoding parameter (such as, and in an embodiment, a quantisation parameter, QP) is used to encode unencoded blocks of data and in which encoded blocks of data can indicate (to a decoder) the values of the encoding parameter used in the encoding process carried out on the unencoded blocks of data. Furthermore, the encoding parameter value used for at least one block of data is determined by a decoder with reference to the encoding parameter value for a preceding encoded block of data in the sequence of encoded blocks of data.

In other words, the technology described herein relates to video encoding formats that use an encoding parameter when encoding unencoded blocks of data, and in which the values of the encoding parameter used when encoding blocks of data can be (and are in an embodiment) indicated to a decoder by including relative encoding parameter values, which are defined with reference to encoding parameter values for preceding encoded blocks of data in the sequence of encoded blocks of data, in encoded blocks of data.

As discussed above, such dependent encoding of blocks of data (i.e. where the encoding parameter value for a given block is determined with respect to a previous block), although beneficial for encoding efficiency, has hitherto been a significant impediment to the parallelization of the encoding process, because of the sequential nature of the dependencies.

However, the Applicants have recognised that although the encoded blocks of data must be configured to allow a decoder to correctly derive the encoding parameter values for encoded blocks of data based on the encoding parameter values of preceding blocks in the correct block sequence order, the encoding process itself need not be limited to encoding blocks of data in that same sequence order.

Additionally, the Applicants have recognized that parallelization of the encoding process can be achieved by splitting up the sequential nature of the dependent encoding.

In the technology described herein, a pair of groups of blocks from a sequence unencoded blocks of data to be encoded are encoded to generate a first and a second group of encoded blocks of data. The first and second groups comprise contiguous blocks of data in the bitstream order of the video data. The second group follows the first group in the bitstream order (and in an embodiment immediately follows the first group in the bitstream order) and furthermore, the encoding parameter value for a block of data in the second group is to be determined by a decoder with reference to the encoding parameter value for a block of data in the first group.

The dependency between the encoding parameter values of the first and second groups of blocks would previously have meant that the first group of unencoded blocks of data would have to be encoded before the encoding process on the second group of unencoded blocks of data could be started. However, in the technology described herein, a value of the encoding parameter to be used when encoding a block of data in the second group is determined before the encoding of all of the blocks of data in the first group has finished.

Hence, the technology described herein determines (e.g. in an encoding parameter value determination operation) an encoding parameter value, e.g. for the first block of data in the second group, without reference to the encoding parameter value for the last block of data in the first group.

This then allows the second group of unencoded blocks of data to be encoded before the encoding of the first group of blocks of unencoded has been finished, thereby facilitating encoding the respective groups of unencoded blocks of data in parallel.

Accordingly, parallelization of the encoding process can be achieved, as the encoding dependency between the first and second groups of blocks is "broken".

However, although the encoding dependency between the first and second groups of blocks is broken to facilitate parallel encoding, the Applicants have recognised that video encoding formats such as MPEG will still require the encoding parameter value for a dependently encoded block of data to be defined with respect to a preceding block.

This is because the corresponding decoder will still derive the encoding parameter value for a given (dependently encoded) block of data based on the encoding parameter value of a preceding block of data in the original sequence order of the data blocks (rather than in the order in which the blocks of data were encoded). For example, and in an embodiment, whilst the encoding process of the technology described herein will encode the first block of data in the second group of data blocks using the determined encoding parameter value (in absolute terms), the resultant encoded block of data will include a relative encoding parameter value that is to be used with the encoding parameter value of the last block of data in the first group to determine the encoding parameter value to be used for the first block of data in the second group of blocks.

As a result, an important feature of the technology described herein is for the "broken" encoding parameter value dependencies between the first and second group of data blocks to essentially be "repaired" for the decoding process. In other words, the dependency, e.g. of the first block of data in the second group on the last block of data in the first group (particularly of the encoding parameter value of the first block of data in the second group on the encoding parameter value of the last block of data in the first group), is "restored" so that the decoder can correctly reconstruct the encoded data.

However, since the encoding parameter value for the block of data in the second group is determined before the encoding of the last block of data in the first group has finished, the system, when encoding, e.g., the last block of data in the first group, will not necessarily encode that data block to include an encoding parameter value that will cause a decoder to use the determined encoding parameter value for the encoded block of data in the second group when decoding the block of data in the second group.

To overcome this, the technology described herein ensures that an encoded block of data in the first group of blocks indicates an encoding parameter value that will cause a decoder to use the determined encoding parameter value for the encoded block of data in the second group when decoding the block of data in the second group. Various techniques for achieving this will be discussed in more detail below.

The sequence of unencoded blocks of data to be encoded may be any suitable and desired such sequence, e.g., representing some or all of a video frame to be encoded. In an embodiment the sequence of unencoded blocks of data is a sequence of blocks representing an entire frame to be encoded.

The blocks are ordered for the purposes of the encoding parameter value determination in the bitstream order of the video image data that is being encoded (i.e. in the order the blocks appear in the bitstream as defined by the video coding standard (format) being used). (The video coding standard will define how the value of an encoding parameter is derived with reference to encoding parameter values of blocks earlier in the encoded bitstream.) This may be the order that the encoded blocks will be processed by a decoder (and thus in one embodiment, the order of the data blocks in the sequence of data blocks is the order that the blocks will be processed in by a decoder), although this is not essential, e.g. where a decoder uses a different decoding order. Thus this will typically be, and in one embodiment is, raster scan order. However, other sequence orders may be used, if desired.

The block of data in the second group of blocks of data for which the encoding parameter value is determined before the encoding of the last block of data in the first group has finished, etc., is in an embodiment the first block of data in the second group.

The blocks of data that are considered in the technology described herein can each represent any suitable and desired part of the video image(s) (frame(s)) being processed. They in an embodiment each correspond to a given region (area) of a frame being processed (e.g. depending upon the video encoding format being used).

Accordingly, each block in an embodiment represents an appropriate (in an embodiment different) region (area) of a frame being processed, such as a plurality of pixels and/or sampling points within the frame. Thus, each block of data is in an embodiment a block of pixels (with each block of pixels comprising, inter alia, data representing appropriate pixel colour values (e.g. RGBA or YUV colour values)). Suitable data block sizes would be, e.g., 8×8, 16×16 or 32×32 pixels in a frame. In an embodiment, the blocks of data are so-called video "macroblocks" comprising a plurality of, e.g., 16×16 samples (pixels) of a frame.

The sequence of unencoded blocks of data that is being encoded could simply be divided into a single pair of two groups of unencoded blocks of data, which pair of groups of unencoded blocks of data will then be processed in the manner of the technology described herein. Alternatively, two groups of unencoded blocks of data that are to be processed in the manner of the technology described herein could be made up from some but not all of the unencoded blocks of data in the overall sequence of unencoded blocks of data.

However, in an embodiment, the overall sequence of unencoded blocks of data (e.g. representing a video frame to be encoded) is divided into plural pairs of first and second groups of unencoded blocks of data, with each such pair of groups of unencoded blocks of data then being (respectively) processed in the manner of the technology described herein.

In such embodiments, the technology described herein will, and in an embodiment does, comprise determining, for each one of the plurality of second groups of data blocks that the sequence of blocks of data (e.g. frame) has been divided into, an encoding parameter value to be used to encode a (and in an embodiment the first) block of data in each one of the plurality of second groups of data blocks.

Similarly, the technology described herein in an embodiment further comprises ensuring that an encoded block of data in each of the plurality of first groups indicates an encoding parameter value that will cause a decoder to use the determined encoding parameter value for the (and in an embodiment the first) encoded block of data in the corresponding second group of blocks when decoding the (in an embodiment first) block of data in the second group of blocks in question.

In these arrangements, each pair of first and second groups of unencoded blocks of data could comprise separate (i.e. not overlapping) groups of unencoded blocks of data (such that, in effect, each pair of a first and a second group of unencoded blocks of data would be independent of all the other pairs of groups of unencoded blocks of data).

However, in an embodiment, where there are plural pairs of first and second groups of unencoded blocks of data being processed for a given sequence of unencoded blocks of data, the respective pairs of first and second groups of unencoded blocks of data overlap, such that the second group of unencoded blocks of a preceding pair of two groups of unencoded blocks of data also forms (acts as) the first group of unencoded blocks of data of the next succeeding pair of first and second groups of unencoded blocks of data to be processed, with the second group of unencoded blocks of data of that succeeding pair of a first and a second group of unencoded blocks of data to be encoded then also serving as the first group of unencoded blocks of data for a further succeeding pair of a first and second group of unencoded blocks of data from the sequence of unencoded blocks of data, and so on.

In other words, in an embodiment, a group of unencoded blocks of data can both act as a "second" group of unencoded blocks of data for a preceding pair of a first and second group of unencoded blocks of data, and as a "first" group of unencoded blocks of data for the succeeding pair of a first and second group of unencoded blocks of data (and at least some of the groups of unencoded blocks of data will do that).

Thus, in an embodiment, the sequence of unencoded blocks of data is divided into three or more groups of unencoded blocks of data, and the groups of unencoded blocks of data that the sequence of unencoded blocks of data has been divided into are then processed as respective pairs of succeeding groups of unencoded blocks of data, with each such pair of groups of unencoded blocks of data being processed in the manner of the technology described herein.

In these arrangements (and otherwise), each group of unencoded blocks of data may comprise any suitable and/or desired number of blocks of data. Each group of unencoded blocks of data in an embodiment contains the same number of blocks of data, but the groups may comprise different numbers of blocks of data, if desired.

In an embodiment, the overall sequence of unencoded blocks of data is divided into a plurality of equal-sized groups of unencoded blocks of data, which groups of unencoded blocks of data are then in an embodiment processed as respective pairs of groups of blocks of unencoded data in the manner of the technology described herein.

In an embodiment, each group of unencoded blocks of data comprises an individual (and the entire) row of blocks of data (e.g. macroblocks) from the frame being processed. Accordingly, the technology described herein in an embodiment operates to process a frame of video data to be encoded in the manner of the technology described herein on a row-by-row basis.

However, other arrangements, e.g., in which each group of unencoded blocks of data comprises some but not all of a row from a frame, would be possible, if desired. For example, each row of a frame being processed could be divided into two groups of blocks of data, one following the other along the row, if desired.

It will be appreciated in this regard that for the first pair of groups of unencoded blocks of data in the sequence of unencoded blocks of data being processed (in the sequence order), the first group of data blocks in that first pair will not be preceded by any preceding group of unencoded blocks of data in the sequence of unencoded blocks of data. The first encoded block of data in the very first group of unencoded blocks of data of the sequence of unencoded blocks of data accordingly should, and in an embodiment does, include an encoding parameter value from which subsequent blocks of data in the sequence of blocks of data may be dependently encoded. Again, this encoding parameter value is in an embodiment determined before that very first group of unencoded blocks of data is encoded, and the first encoded block of data in the group will include an indication of that determined encoding parameter value.

Correspondingly, for the very last (the final) pair of groups of unencoded blocks of data in the sequence of unencoded blocks of data (e.g. frame) being processed, the second group of data blocks in that final pair will not be followed by any following group of unencoded blocks of data in the sequence of unencoded blocks of data. Thus, there is no need to ensure that a block in the second group of blocks of data in the final pair of a first and a second group of unencoded blocks of data of the sequence of unencoded blocks of data indicates, when encoded, an appropriate encoding parameter value that will cause a decoder to derive the determined encoding parameter value for, e.g. the first block of data of a succeeding group of encoded blocks of data.

Correspondingly, for any "middle" pairs of groups of unencoded blocks of data that are to be processed, i.e. where the first group in each pair is immediately preceded by a preceding group of unencoded blocks of data, and the second group in each pair is immediately followed by a subsequent group of unencoded blocks of data, the, e.g., first block of data in the first group of a given such pair of groups of unencoded blocks of data will have an encoding parameter value determined for it. Likewise, it will also (need to) be ensured that a block in the second group of blocks of data in each such pair indicates, when encoded, an appropriate encoding parameter value that will cause a decoder to derive the determined encoding parameter value for the, e.g., first block of data in the next succeeding group of encoded blocks of data.

The encoding parameter that is handled in the manner of the technology described herein may be any suitable and/or desired encoding parameter. In an embodiment the encoding parameter is a parameter indicative of an embodiment of the encoding process used for a block. For example, the encoding parameter in some embodiments is a parameter that is used when encoding, and/or to control the encoding of, the data. In an embodiment the encoding parameter relates to compression that is applied when encoding a data block, and in an embodiment controls (and indicates) the level of compression being used.

In an embodiment, the encoding parameter is a quantization parameter (QP) (particularly in embodiments in which the predetermined video encoding format is an MPEG video encoding format (e.g. H.264)).

The value of the encoding parameter to be used for the first block of a given group of blocks may be determined (selected) in any suitable or desired manner.

In some embodiments, the encoding parameter value is determined based on a property of the block of data in question. For example, the encoding parameter value could be determined based on how important the block is considered for visual quality. For example, a block of data in the centre of a frame is typically more important for image quality, and in most cases an encoding parameter value relating to a lower rate of compression will be used.

In some embodiments the encoding parameter value could be determined based on the content (e.g. the raw pixel data) of the block of data. In embodiments the encoding parameter value could be determined based on, e.g., an estimated complexity of the content of the data block and/or the desired bitrate. In particularly embodiments the estimated complexity of the data block and the desired bitrate is used in a lookup table to determine the encoding parameter value to use. It will be appreciated here that the lookup table will have been pre-configured to the appropriate encoding values for a given complexity and bitrate based on, e.g., the result of previous experimentation or analysis, such as those relating to rate-distortion optimisations.

In other embodiments, the encoding parameter value for the first, e.g., block of a "second" group of data blocks being encoded is based on a property of a previous sequence of data blocks (e.g., and in an embodiment, of the sequence of data blocks forming a or the previous frame). For example, in some cases, the content of a data block, and therefore the desired encoding parameter value for that block, will not change significantly between successive frames to be displayed, such that the encoding parameter value to use can therefore be determined based on, e.g., the encoding parameter value used for the corresponding block in a (the) previously encoded frame.

In an embodiment, the encoding parameter value is determined based on a property of a preceding block in the current sequence of data blocks. For example, the encoding parameter value could be determined based on an encoding parameter value selected for a preceding block of data in the current sequence of data blocks (e.g. current frame).

In some embodiments, the encoding parameter value for a block of data is determined based on a function of the remaining number of bits available for the sequence of blocks of data that the block in question relates to. For example, the encoding parameter value could be linear to the inverse of the remaining number of bits for the sequence.

The Applicants have recognised that there may only be a limited capacity for indicating the encoding parameter value in an encoded data block (e.g. due to there being a limit to the maximum relative encoding parameter value that an encoded data block can indicate). Thus, in embodiments the encoding parameter values for the e.g. first, blocks of given groups of data blocks are chosen such that the (e.g. maximum) difference between the encoding parameter values for any successive blocks of data can be indicated in a single encoded block (i.e. such that the (e.g. maximum) relative encoding parameter value that could need to be included in an encoded block of data can be indicated in a single encoded block).

Although as set out above it is a requirement for the technology described herein that at least the value of the encoding parameter to be used is determined for the, e.g. first, block of data in each "second" group of blocks of data being considered, in an embodiment this is also done for the, e.g. first, block of each "first" group of unencoded blocks of data. In other words, in an embodiment, a value of the encoding parameter to be used for encoding the, e.g. first, unencoded block of data in a group of unencoded blocks of data is determined for all the groups (for each group) of unencoded blocks of data that the sequence of data blocks (e.g. frame) has been divided into.

Thus, in an embodiment, the sequence of unencoded blocks of data is divided into a plurality of groups of unencoded blocks of data, and an encoding parameter value is determined for the, e.g. first, block of data in each group of unencoded blocks of data. This may happen anyway where the pairs of first and second groups of unencoded blocks of data overlap (such that a given group of unencoded blocks of data will act both as a second group of unencoded blocks of data for one pair of groups of unencoded blocks of data, and as a first group of unencoded blocks of data for another pair of groups of unencoded blocks of data).

The, e.g. first, unencoded block of data in each group is then in an embodiment encoded using the determined encoding parameter value.

Correspondingly, in an embodiment, for each group of blocks that precedes another group of blocks in the sequence of blocks of data being encoded, it is ensured that there is an encoded block of data that indicates an encoding parameter value that will cause a decoder to use the determined encoding parameter value for the, e.g. first, encoded block of data in the, e.g. immediately, following group of blocks when decoding that, e.g. first, block of data in the following group.

The encoding parameter values to be used for each, e.g. first, block of the groups of unencoded blocks being considered can be determined in any desired and suitable order and timing.

In one embodiment the encoding parameter value determination for the, e.g. first, data block of each group of data blocks is performed as a pre-processing operation (in advance), before the encoding of any of the data blocks in the sequence is begun. Accordingly, before the encoding process on the groups of data blocks is performed, the encoding parameter value for the, e.g. first, data block of each group of data blocks being considered is determined.

In another embodiment, the encoding parameter value determination operation is not performed for all the pairs of data block groups in advance, but is performed for each group of data blocks as they fall to be encoded. In this embodiment, the encoding parameter value determination operation will be performed "on-the-fly", with only the encoding parameter value for the, e.g. first, block of a group about to be encoded being determined at any one time. The encoding parameter value determination operation will thus be carried out for the groups of unencoded blocks of data which are to be encoded in turn.

The encoding parameter value may be determined by any suitable and desired component or element (e.g. processor) of the video encoding system, such as an encoding unit of the video encoding system.

Where the system includes plural encoding units, then the encoding parameter value determination operation may be performed by one of the encoding units only, or the encoding parameter value determination operation may be distributed over, and, e.g., performed in parallel by, plural of (e.g. all of) the encoding units.

Once the value of the encoding parameter to be used for the, e.g. first, block of a given group of data blocks has been determined, the, e.g. first, data block in the group can be, and is in an embodiment, encoded using the determined encoding parameter value.

The, e.g. first, data block in a group can be encoded using any suitable and desired encoding type. In one embodiment, it is encoded as a block type that can indicate a relative encoding parameter value (although this is not essential, as will be discussed further below).

Thus, in an embodiment, a relative encoding parameter value to be used by a decoder to derive the encoding parameter value to be used (together with the encoding parameter value for an encoded block of data in the preceding group) when decoding the, e.g. first, block of data in the group of blocks of data is included in the encoded version of the, e.g. first, data block of a (second) group of data blocks.

In these arrangements, the relative encoding parameter value that is included in (indicated by) the encoded block of data can be any suitable and desired relative encoding parameter value that can be used by a decoder to derive the encoding parameter value to be used when decoding the block of data.

In an embodiment the relative encoding parameter value for a given, e.g. first, block of a group is based on an estimate of the encoding parameter value for the last block of the previous group. In embodiments, this estimate is based on the encoding parameter value that has been determined to be used for a block of data (and in an embodiment for the first block of data) in the preceding group of blocks.

Thus, in an embodiment, the relative encoding parameter value that is included in a given, e.g. first, block of a group of data blocks is based on both the determined encoding parameter value to be used for encoding that block, and an encoding parameter value that has been determined to be used for a block of data in the, e.g. immediately, preceding group of blocks in the sequence of blocks being encoded.

In an embodiment, and as will be discussed further below, the relative encoding parameter value that is included in a given, e.g. first, block of a group of data blocks is in an embodiment based on both the determined encoding parameter value to be used for that block, and the encoding parameter value that has been determined to be used for the first block of the, e.g. immediately, preceding group of blocks in the sequence of blocks being encoded. For example, the relative encoding parameter value could simply represent the difference between the determined encoding parameter value to be used for the block and the encoding parameter value that was determined for the first block of the, e.g. immediately, preceding group of blocks in the sequence (and in an embodiment, this is what is done).

The subsequent data blocks in the group of blocks being encoded can then be encoded in the normal manner, e.g. dependent upon the first data block in the group, and/or using the encoding parameter value determined for the first block in the group. The encoding process in an embodiment proceeds block-by-block through a group of unencoded blocks of data, performing the encoding process on each block in turn.

The actual encoding of the groups of data blocks can be performed in any desired and suitable manner. For example, the groups of data blocks could simply be encoded one after another.

However, as discussed above, the technology described herein in particular facilitates parallelization of the encoding operation, and so in an embodiment the groups of data blocks that the sequence of data blocks has been divided into are encoded in parallel. Thus, in an embodiment, for a given pair of a first and second group of an unencoded blocks of data, in an embodiment the first group and the second group of unencoded blocks of data of the pair will be encoded, at least in part, in parallel (i.e. at the same time, on different encoding units). This is in an embodiment the case for at least one pair of a first and a second group of unencoded blocks of data of the sequence of unencoded blocks of data.

Correspondingly, in an embodiment, the encoding process is performed on respective unencoded blocks of data in a first group of unencoded blocks of data in parallel with the encoding of blocks of data of a second group of unencoded blocks of data.

The parallelization of the encoding can be achieved and configured in any suitable and desired manner. For example, where there are two encoding units operating in parallel, alternative groups of blocks in the sequence of data blocks could be allocated to respective ones of the encoding units. Where there are more than two encoding units, the groups of data blocks can be distributed between the plural encoding units for encoding as appropriate and desired.

The encoding operation itself can be carried out by any desired and suitable component or element of the overall video processing system. In an embodiment the system includes an encoding unit or units for this purpose, that are each operable to encode "raw" video data in a given video encoding format or formats. As discussed above, the system in an embodiment comprises plural encoding units which can operate to encode groups of unencoded blocks of data in parallel. In this regard, any desired number of encoding units can be comprised, such as, for example, two encoding units, up to, e.g., as many encoding units as the number of groups that a given sequence of unencoded blocks of data (e.g. frame) will be divided into.

The encoding units of the system may be configured and provided as desired, for example in a single processor, or as separate processing cores in a multi-core system.

As discussed above, the encoded version of the, e.g. first, block of data in the second group of data blocks of a given pair of groups of data blocks being encoded in an embodiment includes a relative encoding parameter value to be used by a decoder to derive the encoding parameter value to be used when decoding that block of data in the second group. That relative encoding parameter value for the, e.g. first, block of data in the second group will be used by a decoder with reference to the encoding parameter value for the last encoded block of data in the first group of the pair to derive the encoding parameter value to be used when decoding the, e.g. first, block of data in the second group.

However, the Applicants have recognised that where the encoding process is parallelised, the encoding of the first block of data in the second group will be likely to be completed before the encoding of the last block of data in the first group has finished.

As a result, the relative encoding parameter value included in the encoded version of the first block of data in the second group will not be based on a known encoding parameter value for the last block of the preceding group of blocks, and so will not necessarily allow the determined encoding parameter value (that was used to encode the first block of data in the second group) to be correctly determined when using the relative encoding parameter value indicated by the first encoded block of data in the second group with reference to the encoding parameter value for the last encoded block of data in the preceding first group.

To address this, the operation of the technology described herein ensures that an encoded block of data in the first group of a given pair of groups of blocks of data to be encoded indicates an encoding parameter value that will cause a decoder to derive the (correct) determined encoding parameter value for the, e.g. first, encoded block of data in the second group of the pair of groups of blocks of data, e.g. when using the relative encoding parameter value included in the, e.g. first, encoded block of data in the second group to derive the encoding parameter value to be used when decoding the, e.g. first, block of data in the second group.

In other words, the technology described herein ensures that the last encoding parameter value indicated to the decoder before it begins to process (decode) the first encoded block of data in the second group will be an appropriate value for causing the decoder to derive the determined encoding parameter value for the first encoded block of data in the second group.

This will then allow a decoder, which will follow a bitstream order according to the selected video encoding format when reconstructing the encoded video data, to determine the correct value to use for the encoding parameter when decoding the first block of the second group of blocks (so that it may correctly decode the encoded data).

The encoding parameter value that is indicated in an encoded block of data in the first group in this regard should be, and is in an embodiment, a value that when used, e.g. with the relative encoding parameter value included in the encoded version of the, e.g. first, block of data in the second group will cause a decoder to derive the (correct) determined encoding parameter value for the, e.g. first, encoded block of data in the second group. Thus, the encoding parameter value that is indicated in an encoded block of data in the first group should depend on how the decoder determines the encoding parameter value to use based on the indicated encoding parameter values.

For example, where a decoder determines the encoding parameter value to use for the, e.g. first, block of data in the second group by combining (e.g. adding) the relative encoding parameter value indicated in the, e.g. first, block of data in the second group with the encoding parameter value used for a preceding block, it should be, and is in an embodiment, ensured that a block in the first group indicates an encoding parameter value that is, e.g., the determined encoding parameter value for the first block of data in the second group less the relative encoding parameter value indicated in the first block of data in the second group.

Ensuring that an encoded block of data in the first group of blocks indicates the appropriate encoding parameter value can be done in any suitable and desired manner.

In an embodiment, this is done by setting an encoded block of data in the first group of encoded data blocks to indicate the appropriate encoding parameter value. This is in an embodiment done by indicating in the encoded block a relative encoding parameter value that will result in the appropriate encoding parameter value for the block.

In this case, the block of data in the first group is in an embodiment also encoded using the so-indicated encoding parameter value. This may, and in an embodiment does, comprise encoding the block using an encoding parameter value that is different to and/or modified from the encoding parameter value that would otherwise be used for the block if it were not required to indicate the encoding parameter value for use with the, e.g. first, block in the second group of blocks (i.e. to the value that the encoder would have used for the block simply based on the content of the data block and the desired bitrate, for example).

(On the other hand, if the encoding scheme allows an encoded block to indicate an encoding parameter value, without actually having to encode the block of data using that indicated encoding parameter value, the block can be encoded using a different encoding parameter value, if desired.)

The block of data that is set to indicate the appropriate encoding parameter value can be any suitable and desired block of data in the first group of blocks of data. In one embodiment, the last block of data in the first group of blocks of data is set to indicate the appropriate encoding parameter value. In this case, the technology described herein will ensure the correct dependency between the last block of data in the first group and the first block of data in the second group of the pair of groups of blocks of data in question from the decoder's perspective.

In other embodiments, a given, in an embodiment selected or desired, block of data in the first group that is not the last block of data in the first group is set to indicate the appropriate encoding parameter value. This may be particularly useful in arrangements where the encoding parameter values for the subsequent blocks of data in the group are or can be unchanged from block to block (such as for sequences of blocks where the content of the blocks does not vary much between blocks.) For example, the same encoding parameter value could be used for the entire group of blocks. In such an arrangement, the first block of data in the first group of data blocks of the pair of groups of data blocks in question is set to indicate the appropriate encoding parameter value.

In one embodiment, the setting of a block (or blocks) in a first group of blocks to indicate a desired encoding parameter value is performed during the encoding process itself. It is equally possible, however, for this to be done separately to the encoding process, e.g. as a post processing operation. In such arrangements, at least one pair of first and second groups of data blocks will first be encoded, but the resulting encoded blocks of data (e.g. the resulting bitstream) will then be processed to set a block of encoded data in the first group to indicate the appropriate encoding parameter value that will cause a decoder to derive the determined encoding parameter value for the, e.g. first, encoded block of data in the second group.

Where the ensuring step is performed as a post processing operation, it would also be possible (and in some embodiments this is done), to also or instead (and in an embodiment instead) set the encoding parameter value for the, e.g. first, block of data in the second group to an appropriate value for causing the decoder to derive the determined encoding parameter value for the first encoded block of data in the second group (since the encoding parameter value of the last block of the previous group will be known post processing). In one embodiment, this is what is done. (However, the Applicant has recognised that this may not always be possible, since the relative encoding parameter value that could need to be included in the encoded block of data in some cases may not be able to be indicated in a single encoded block.)

The above arrangements could operate simply to always set a block of data in the first group to indicate an appropriate encoding parameter value (and in one embodiment, this is what is done). Thus, for example, the process could always encode the last block of a "first" group to indicate the desired encoding parameter value.

However, the Applicants have recognised that it could be the case that a block of data in the first group of blocks will be encoded using (and thus indicate) the desired encoding parameter value to be indicated by a block of data in the first group in any event. In such cases, an encoded version of a block of data in the first group will already indicate the appropriate encoding parameter value, without the need to further "force" a block of data in the first group of blocks to do that.

Accordingly, in an embodiment, it is first checked whether a block of data in the first group already indicates the appropriate encoding parameter value, and then only if a block of data in the first group does not already indicate the appropriate encoding parameter value, is a block of data in the first group set to indicate the appropriate encoding parameter value.

In this embodiment, the "ensuring" process will thus comprise determining (e.g. at a decision stage) whether the encoding parameter value for a block of data in the first group will cause a decoder to derive the determined encoding parameter value for the, e.g. first, encoded block of data in the second group of the pair of groups (e.g. when using the relative encoding parameter value for the first block of data in the second group), and if it is determined that the encoding parameter value for a block of data in the first group will not cause a decoder to derive the determined encoding parameter value for the, e.g. first, encoded block of data in the second group, then setting a block of data in the first group to indicate the appropriate encoding parameter value (but if it is determined that the encoding parameter value for a block of data in the first group will cause a decoder to derive the determined encoding parameter value for the, e.g. first, encoded block of data in the second group, not then setting a (further) block of data in the first group to indicate the appropriate encoding parameter value).

The determination can be done in any suitable or desired way, for example by keeping track of the encoding parameter value being used as the first group of blocks is being encoded, and determining when (and if) this is the desired value for use with the, e.g. first, block of the second group of blocks.

Thus, in an embodiment the ensuring process comprises conditionally modifying the encoding parameter value for a block of data in the first group so as to ensure that a block of data in the first group will indicate an encoding parameter value that will cause the decoder to derive the determined encoding parameter value for the, e.g. first, block of data in the second group. Conditionally modifying the encoding parameter value for a block of data in the first group can be implemented in any suitable and desired way, e.g. during the encoding process itself, or separately to the encoding process as a post-processing operation.

It will be appreciated from the above that in embodiments of the technology described herein at least, for a given pair of a first and a second group of encoded blocks of data, an encoding parameter value to use for the first block of data in the second group of the pair will be determined. That first encoded block of the second group of data blocks, and an encoded block (e.g. the first or last block) in the preceding first group of encoded blocks of data (of the pair), will each indicate a respective relative encoding parameter value, with the two relative encoding parameter values being selected and set such that together they will cause (together with any preceding encoding parameter value that has already been used for or indicated by preceding blocks in the sequence of blocks) a decoder to derive the determined (selected) encoding parameter value for the first block in the second group of blocks.

Furthermore, the appropriate relative encoding parameter value indicated by an encoded block in the first group of blocks can either be present as a consequence of a block in that group being encoded using the corresponding encoding parameter value, or by "forcing" an encoded block of the first group of blocks to indicate the appropriate relative encoding parameter value (and in an embodiment to use the desired corresponding encoding parameter value).

Where a given encoded block of data in the first group of blocks of data of a given pair of a first and a second group of blocks of data is to be set to indicate to a decoder a particular encoding parameter value so as to ensure that a decoder will derive correctly the determined encoding parameter value for the, e.g. first, encoded block of data in the second group, then where the encoding type (the block, e.g. macroblock, type) to be used for encoding the block of data in the first group of blocks of data allows the desired encoding parameter value (e.g. relative encoding parameter value) to be indicated in the encoded block, then that can simply be done.

However, the Applicants have recognised that in some cases where it is desired to set an encoded block of data in the first group to indicate the encoding parameter value, then the (originally) intended encoding type for the block (block type) may not support indicating the appropriate encoding parameter value.

For example, the Applicants have recognised that some encoded block types do not allow a change in encoding parameter value to be indicated to a decoder, for example because they do not include a "relative encoding parameter value" field.

For example, many video encoding formats allow blocks of data that have not changed relative to a preceding reference block on which the block in question is dependent (e.g. a block having a motion vector of (0, 0) and zero residual) to be encoded in a very efficient form, which does not permit other encoding parameter values to be indicated to the decoder. Typically, such a data block is encoded using an encoding type that uses a reduced, and in some cases different, set of syntax elements to that used in a "full" encoding type, wherein the different set of syntax elements does not include syntax elements that can support indicating an encoding parameter value to the decoder. For example, in the H.264 video encoding format, such a data block (or sequence of such data blocks) is encoded as a "skip" block type, using a "skip" syntax element, where typically no information is encoded other than a skip indication. (Other encoding formats have equivalent syntax elements.)

So called "skip blocks" cannot indicate an encoding parameter value to the decoder. Instead, the decoder will read the skip indication and in response to that will use the decoded data from a previous block in the sequence of blocks as the data for the block to which the skip indication relates. The Applicants have recognised that this can lead to problems for the encoding in arrangements where the block of data that requires setting to the appropriate encoding parameter value is, e.g., a "skip" block.

In cases where the block of data that requires setting to the appropriate encoding parameter value is an, e.g., skip block, in some cases it would still be possible to ensure that a block of data in the first group indicates an encoding parameter value that will cause the decoder to derive the determined encoding parameter value for the, e.g. first, block of data in the second group by setting a preceding block of data in the sequence to indicate the appropriate encoding parameter value. However, this may not always be desirable or even possible (e.g. where each block of data in the group is a "skip" block).

Thus, in an embodiment, the process of setting an encoded block of data in the first group to indicate an encoding parameter value that will cause a decoder to derive the correct, determined encoding parameter value for the, e.g. first, encoded block of the second group can, and in an embodiment does, comprise, if necessary, encoding the block in the first group that is to be so-set using an encoding type that is different to and/or modified from the encoding type that would otherwise be used for the block if it were not required to indicate an encoding parameter value for use with the, e.g. first, block in the second group of blocks.

Correspondingly, where the encoding parameter value for the, e.g. first, block of data in the second group is set to an appropriate encoding parameter value in post processing, in an embodiment, the process of setting can, and in an embodiment does, comprise, if necessary, encoding the, e.g. first, block in the second group that is to be so-set using an encoding type that is different to and/or modified from the encoding type that would otherwise be used for the block if it were not required to indicate an encoding parameter value.

For example, and in an embodiment, the above embodiments can, and in an embodiment do, comprise encoding a block that would otherwise be encoded as a "skip" block as a "non-skip" block in order to allow the encoded block to convey the desired encoding parameter value to a decoder.

In these arrangements where the encoding type for an encoded block of data is modified from the encoding type that would otherwise be used for the block, in an embodiment the alternative encoding type that is used is an encoding type that is sufficient to be able to indicate the desired encoding parameter value (e.g. an encoded block type that can include a relative encoding parameter value), but that otherwise encodes the block efficiently, and in an embodiment otherwise as efficiently as possible (e.g., and in an embodiment, is as close to a "skip" encoding as possible whilst still being able to indicate the desired encoding parameter value to a decoder). Thus, for example, where available, an encoding type that is not a "full" encoding type that can convey the encoding parameter value to a decoder is in an embodiment used, rather than simply using a "full" encoding type for the block.

In embodiments the alternative encoding type that is used is one which uses a different set of syntax elements to that which would otherwise be used for the block, wherein the different set of syntax elements comprises at least one syntax element that can support indicating the appropriate encoding parameter value.

Thus, in an embodiment, the process of ensuring that a block of data in the first group indicates a suitable encoding parameter value can and does comprise forcing a "skip" block to be "non-skipped" in order to comprise an encoded block of data that indicates a (changed) encoding parameter value. This may be done, e.g., where it is determined, e.g. at the decision stage, that the block of data in the first group requiring setting to the appropriate encoding parameter value is in fact a skip block.

Whilst the above embodiments of the technology described herein have been described primarily with reference to including a relative encoding parameter value in the encoded version of the first block of data for a given group, this need not be the case.

The techniques and features described above are equally applicable in arrangements in which the first block (or blocks) of data in the second group of blocks of data is encoded using an encoding type that does not support including a relative encoding parameter value in the encoded version of the data block. This would be the case, for example, where the first block of data of a given group can be (and is) encoded as a skip block.

In this case, where a first block of data in a given group is determined to be encoded as a skip block, an encoding parameter value will still be determined for that block, but the encoded version of the block will not contain any information regarding that determined encoding parameter value. Instead, the encoding will be a skip indication.

In this case, the decoder, in response to the skip indication, will use the encoding parameter value for a previous block in the sequence of blocks as the encoding parameter value to be used to decode the block to which the skip indication relates. Thus, it is still necessary to ensure that an encoded block of data in the, e.g. immediately, preceding group (i.e. the first group) indicates an encoding parameter value that will cause the decoder to derive the determined encoding parameter value for the, e.g. first, encoded block of data in the second group when decoding the, e.g. first, block of data in the second group.

In this case, it should be ensured that the last encoding parameter value indicated to the decoder before it begins to process the, e.g. first, encoded block of data in the second group (the skip block) will be the determined encoding parameter value for the, e.g. first, encoded block of data in the second group. For example, an encoded block of data in the first group can be set to indicate the determined encoding parameter value for the first encoded block of data in the second group (and in an embodiment this is what is done).

This may, and in an embodiment does, comprise, if necessary, encoding the block of data in the first group using an encoding parameter value that is different to and/or modified from the encoding parameter value that would otherwise be used for the block if it were not required to indicate the encoding parameter value for use with the, e.g. first, block in the second group of blocks (i.e. to the value that the encoder would have used for the block simply based on the content of the data block and the desired bitrate, for example). The Applicants believe that the idea of changing the determined encoding type for a block of video data in order to convey information to a decoder may be novel and inventive in its own right.

Thus, a third embodiment of the technology described herein comprises a method of encoding video image data comprising a sequence of unencoded blocks of data into a sequence of encoded blocks of data in a video encoding format, the method comprising:

for at least one block of data in the sequence:

selecting a different encoded block type to be used to encode the block of data in order to be able to include in the generated corresponding encoded block of data information that is to be conveyed to a decoder.

A fourth embodiment of the technology described herein comprises an apparatus for encoding video image data comprising a sequence of unencoded blocks of data into a sequence of encoded blocks of data in a video encoding format, the apparatus comprising processing circuitry configured to:

select a different encoded block type to be used to encode a block of data in the sequence in order to include in the generated corresponding encoded block of data information that is to be conveyed to a decoder.

As will be appreciated by those skilled in the art, these embodiments and embodiments of the technology described herein can, and in an embodiment do, include, as appropriate, any one or more or all of the features of the technology described herein described herein. Thus, for example, the encoding type for the at least one block of data is in an embodiment changed from the block being encoded as a "skip" block, to the block being encoded as a "non-skip" block, and/or the information to be conveyed to a decoder is in an embodiment a change in the value of an encoding parameter, e.g. a change in the value of the quantisation parameter.

Once a different encoding type for the block has been selected, the block should then be, and is in an embodiment then, encoded as the selected encoding type so as to convey the information to a decoder.

In an embodiment of these embodiments and embodiments of the technology described herein the encoding of the block of data comprises determining an encoded block type to use when encoding the unencoded block of data to generate the corresponding encoded block of data; and encoding the unencoded block of data to generate the corresponding encoded block of data using an encoded block type that is different to the determined encoded block type for the unencoded block of data in order to include in the generated corresponding encoded block of data information that is to be conveyed to a decoder.

The changing of the encoding type (the use of a different encoded block type to the determined encoded block type) for the unencoded block of data is in an embodiment in response to identifying that there is a need to convey, in an embodiment particular, in an embodiment selected, information to a decoder, and/or in response to identifying that an initially determined encoded block type for the unencoded block of data cannot convey the required information to a decoder.

Thus, these embodiments and embodiments of the technology described herein in an embodiment comprise determining whether an initial encoded block type for the block of data will be able to convey the desired information to a decoder; and if it is determined that the initial encoded block type for the block of data will not be able to convey the desired information to a decoder;

selecting and using a different encoded block type to encode the block that can convey the desired information to a decoder.

Where an encoder has a module configured to determine the block encoding type to use when encoding an unencoded block of data, then in an embodiment the (potential) changing of the encoding type is implemented at this "decision" stage as well. This may require little extra hardware and software code.

In embodiments the different encoded block type uses a different set of syntax elements to that which would otherwise be used for the block, wherein the different set of syntax elements comprises at least one syntax element that can support indicating the desired information to a decoder.

Although the technology described herein has been described above primarily with reference to the processing of a given sequence of unencoded blocks of data (e.g. representing a video frame to be encoded), as will be appreciated by those skilled in the art, the technology described herein can be, and in an embodiment is, applied to successive sequences of blocks of data to be encoded, e.g., and in an embodiment, to successive frames (to each frame) in a sequence of video frames to be encoded.

The technology described herein can be implemented in any suitable system, such as a suitably configured microprocessor based system. In an embodiment, the technology described herein is implemented in a computer and/or micro-processor based system.

The system can include any suitable and desired components or elements to allow the operation in the manner of the technology described herein, such as, for example, one or more encoding units (one or more video encoding units (as discussed above), a suitable processor or processors (for performing the encoding or otherwise), and memory for storing the data that is required (such as the unencoded video data and the consequent encoded data blocks).

The actual encoding format that is used when encoding the video data can be any suitable and desired such format (that at least uses an encoding parameter that is indicated in the encoded data stream using relative values), such as, for example, MPEG and H.264.

In an embodiment, the technology described herein further comprises arranging the output of the encoding process into a single consecutive bitstream in the predetermined video encoding format (that is then suitable for a decoder to decode). This may be performed, e.g., by a suitable "stitch" engine, that "stitches" the output of the respective encoding units at the bit-level or byte-level into a single consecutive bitstream.

This operation could be performed as a bulk operation after several first groups and second groups of unencoded blocks of data have been encoded, but in one embodiment this operation is performed as encoded groups of data blocks are generated. In other words, the operation of the, e.g., stitch engine, is in an embodiment integrated with the operation of the encoding units such that as soon as two groups of unencoded blocks of data have been encoded and output by the encoding units, these results are stitched together into a single consecutive bitstream (and so on).

The encoded blocks of data (bitstream of the encoded data) can then be handled as desired for future use, e.g. by being suitably stored and/or by being transmitted to a decoder for decoding. The decoder can then subsequently decode the encoded video data in the normal manner, using the relative encoding parameter values included in the encoded data to derive the appropriate encoding parameter value to use when decoding the encoded data.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

In an embodiment, the system comprises, and/or is in communication with, one or more memories and/or memory devices that store the data described herein, and/or that store software for performing the processes described herein. The system may also be in communication with the host microprocessor, and/or with a display for displaying images based on the output of the system.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be comprised as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the video processor can otherwise include any one or more or all of the usual functional units, etc., that video processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described. The embodiments described herein with reference to the accompanying drawings are example implementations of the technology described herein in which unencoded blocks of pixel data are encoded according to one of the MPEG video encoding formats such as H.264, and wherein the encoding parameter used is the quantization parameter (QP).

FIG. 1 schematically illustrates a sequence of encoded blocks of pixels. The first block of pixels in the sequence is independently encoded and its encoding parameter value (e.g. the quantization parameter QP, in this example) is indicated in the data block (encoded in absolute terms in this example, although this is not essential). The following blocks of pixels, however, are each encoded with reference to the preceding block of pixels, wherein the QP value for each block of pixels is dependently encoded as a relative value referring to the previous block's value. An entire frame (or part thereof) of video image data can be encoded as such a sequence, with the sequence of blocks following the familiar raster scan pattern through the frame (i.e. the order in which a decoder will process the blocks of data).

The sequential nature of the QP dependencies schematically illustrated in FIG. 1 demonstrates a difficulty for the parallelization of the encoding task, because in order to encode any given dependently encoded block of pixels, in principle each of the preceding blocks of pixels must have already been encoded.

Figure 2:
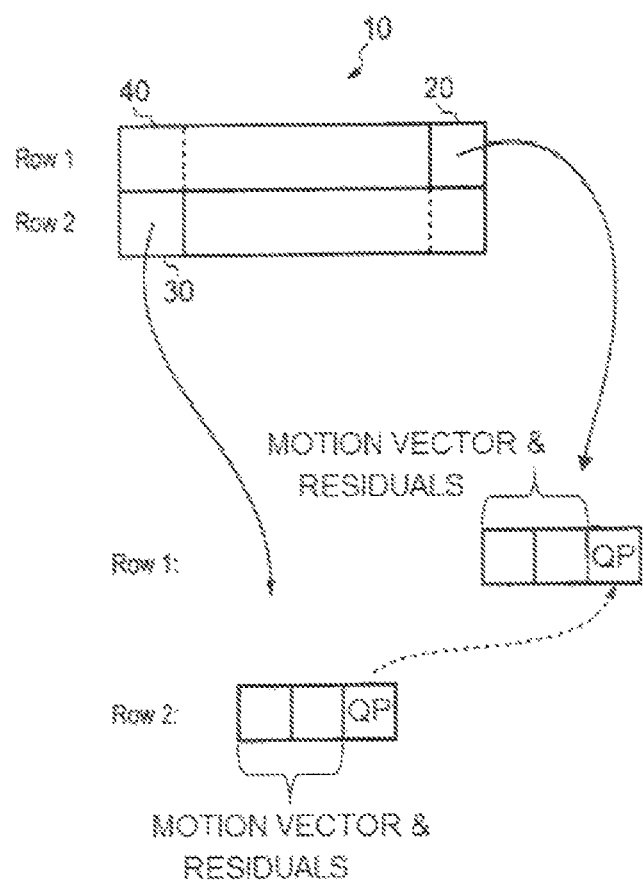
FIG. 2 schematically illustrates two rows of an image that may be encoded.

FIG. 2 schematically illustrates two rows 10 of a frame of video image data. As will be familiar to the person skilled in the art, the encoding of a given block of pixels will commonly include encoding the motion vector and residual values etc., as well as the QP value to be used for the block. If the first block 30 in the second row is to be dependently encoded relative to the last block 20 in the first row (shown by the dashed arrows) (with the consequent reduction in data size of the final encoded image that this would bring), in existing encoding systems, the block 20 must be encoded before the block 30. Moreover, if block 20 itself is a dependently encoded block, the chain of dependencies leads all the way back to the first block of pixels 40 in the first row.

This leads to difficulty when the two rows are desired to be encoded in parallel. This will now be described further in relation to FIG. 3.

Figure 3:
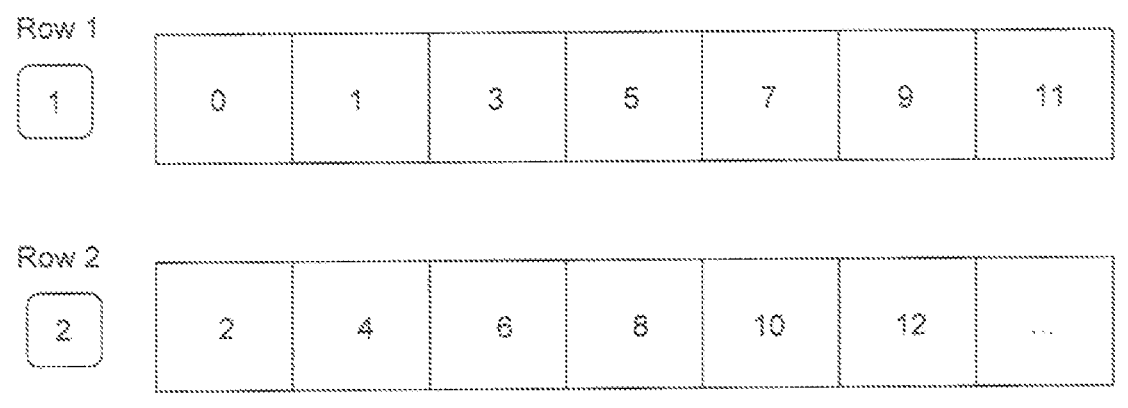

FIG. 3 illustrates two rows of unencoded blocks of pixels that have been allocated to separate encoding units (a first and second encoding unit) which will operate in parallel with one another. As will be understood in the art, the encoding process itself will typically be interleaved between the first and second row of blocks, with, for example, the first two blocks of row 1 being processed first, followed by the first block of row 2, the third block of row 1, the second block of row 2, and so on and so forth. (To highlight this, the numbering of each block in FIG. 3 indicates the order at which the blocks are processed.)

(It will be appreciated here that the encoding order shown in FIG. 3 is for illustrative purposes only. For dependency handling purposes a parallel encoder will behave similarly to a sequential one that encodes in the order discussed above (thus the order in which encoding of the blocks is started will be approximately as shown), but the processing of the blocks will, of course, be in parallel.)

As can be seen in FIG. 3, the first block of row 2 (block 2) is encoded before blocks, 3, 5, 7, 9 and 11 of row 1, which means that the second encoding unit will not know the correct QP value to include when encoding block 2 of row 2 (since the correct QP value to use for block 2 will depend on the QP value used for the last block of row 1, which has not yet been established).

The Applicants have however realised that these dependencies need not prevent the parallelization of the encoding of the first and second row of video data blocks.

In the present embodiment, parallelization is achieved by performing an encoding parameter value determination operation to determine a QP value to be used for the first data block of row 2 (and thus the QP value which the next block in row 2 will be dependent upon) before the final block of row 1 has been encoded and then ensuring that an encoded block of data in the first row indicates an encoding parameter value that will cause a decoder to use the determined encoding parameter value for the first encoded block of data in the second row when decoding the first block of data in the second row. If necessary, this includes modifying one of the encoded blocks of data in row 1, for example by changing the encoding mode from e.g. a skip mode to a "normal" mode.

(It will be appreciated that the encoding parameter value determination operation may also be performed with respect to the first unencoded block of pixels in the first row to determine a QP value to use when encoding the first unencoded block of pixels in the first row.)

In the embodiment contemplated in FIG. 3, the encoding parameter value determination operation is performed as a pre-processing step wherein the video encoding apparatus first determines a QP value to be used for block 2 (block 30 in FIG. 2) before initiating the main encoding process carried out by two encoding units, one encoding unit handling row 1 and the other encoding unit handling row 2. The encoding unit which encodes row 2 can then encode blocks 4, 6, 8 . . . relative to block 2 using relative QP values whilst the other encoding unit handles row 1.

As well as the second encoding unit encoding the first block of data in the second row using the determined QP value for the first block in the second row, it will also include a suitable relative encoding parameter value in the encoded data block to be used by the decoder for determining the encoding parameter (QP) value used to encode the block in question.

This relative encoding parameter (QP) value can be any desired and suitable value, because the process will ensure that an encoded block of data in the first group indicates an encoding parameter (QP) value that will cause a decoder to derive the determined encoding parameter (QP) value for the first encoded block of data in the second group when decoding the first block of data in the second group. Thus, whatever relative encoding parameter value is included in the first encoded data block of the second group, the process will configure a block in the first group of encoded blocks so as to ensure that a decoder will use the determined encoding parameter (QP) value when decoding the block in question (this will be discussed further below).

Although FIGS. 2 and 3 show a single pair of groups of unencoded video image data, the principles described therein can be applied across an entire frame of video image data, for example by treating each respective pair of rows of the frame as being a pair of a first and a second group of unencoded blocks of data that will then be processed in the manner of the technology described herein.

Figure 4:
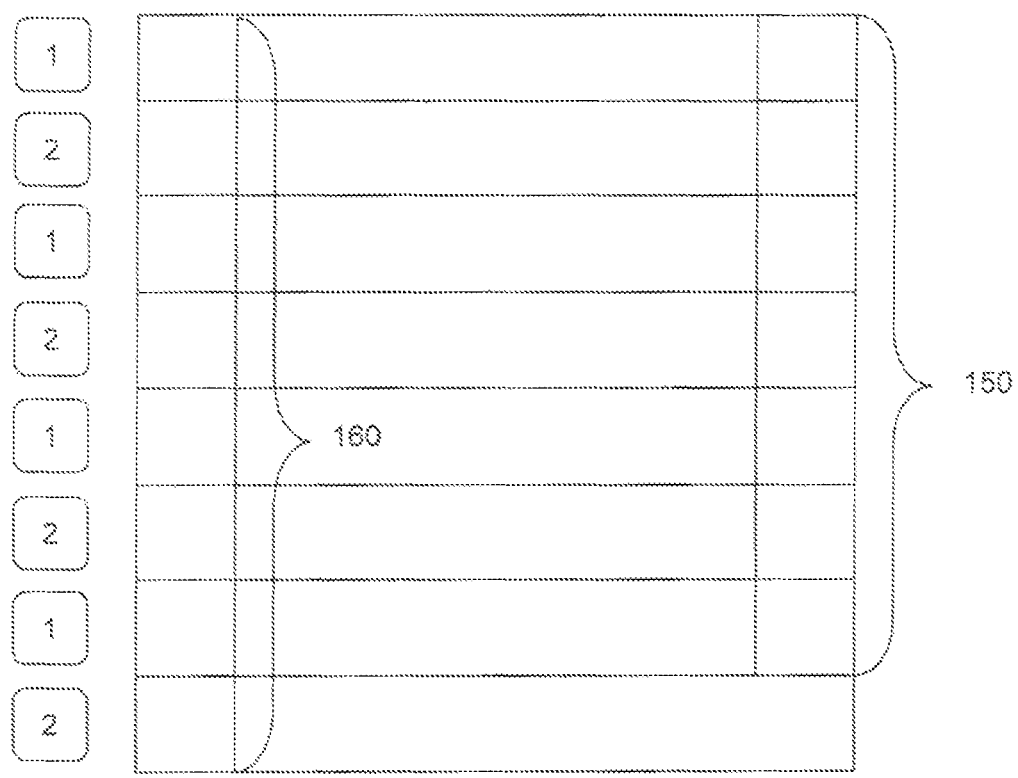
FIG. 4 schematically illustrates how a frame of video image data may be allocated between two encoding units and the particular blocks of pixels where the dependencies must be broken in order to allow parallel operation of the two encoding units.

FIG. 4 schematically illustrates this and shows how the rows of a frame of unencoded video image data may be divided into respective pairs of first and second groups (rows) of video data, e.g. to be allocated between two encoding units (with the encoding units being allocated alternate rows of the frame).

As can be seen in FIG. 4, the frame is divided into a plurality of pairs of first and second rows of pixel blocks. A first encoding unit may encode the plurality of first rows and a second encoding unit is configured to perform the encoding process on the plurality of second rows. (It will be appreciated that although the sub-division of blocks of pixels to be encoded is shown to be performed on the basis of rows of blocks of pixels in a frame of video image data, it is not necessary to parallelize the encoding process in this manner. For example, the blocks of pixels in an image frame may be arbitrarily subdivided into pairs of first and second groups of un-encoded blocks of pixels for allocation to the encoding units, although in an embodiment the blocks will be subdivided logically and/or according to the encoding format used.)

FIG. 4 also shows the set of first blocks 160 of pixels in each row for which the encoding parameter (QP) value determination operation will be carried out in order to allow the dependent encoding of the QP values in the rows. In the example illustrated in FIG. 4, the set of first blocks 160 of pixels for which the encoding parameter (QP) value determination operation will be carried out includes the first block of pixels in each row of the frame. However, other arrangements are of course possible. In some arrangements, the encoding parameter value determination operation will be carried out for the first block of data in each of the plurality of second rows only.

FIG. 4 also shows the set 150 of last blocks of pixels in the rows which will, in this example, indicate QP values that will cause a decoder to use the determined QP (encoding parameter) values for the first block of pixels in the subsequent row. Note that the set 150 of last blocks of pixels does not include the last block of pixels in the last row, since there is no following block of pixels (row) for which the decoder will need to implement a quantization parameter change.

When handling a frame of video image data such as that schematically illustrated in FIG. 4, the two encoding units may be configured to perform a pre-processing operation wherein the encoding parameter (e.g. QP) value for each of the blocks of pixels in the set 160 is determined in advance. Alternatively, the encoding parameter (e.g. QP) value for each of the blocks of pixels in the set 160 could be determined on-the-fly, as a step preceding each pair of rows being encoded by the two encoding units. Typically the two encoding units are configured to share this operation, however, in an alternative embodiment it may be performed by a selected one of the two encoding units.

It will be appreciated that the rows of a frame of unencoded video image data may be handled by any number of encoding units. In principle any such permutation is possible, indeed full parallelization of the encoding of a frame of video image data could be achieved by providing one encoding unit for each row of the video image data. In the example shown in FIG. 4, the rows of the frames are allocated to the encoding units in a repeating, alternating pattern. However the video encoding apparatus can also, e.g., be configured to allocate each row in dependence on the availability of the encoding units. Hence a strict alternating allocation need not be followed.

Figure 5:
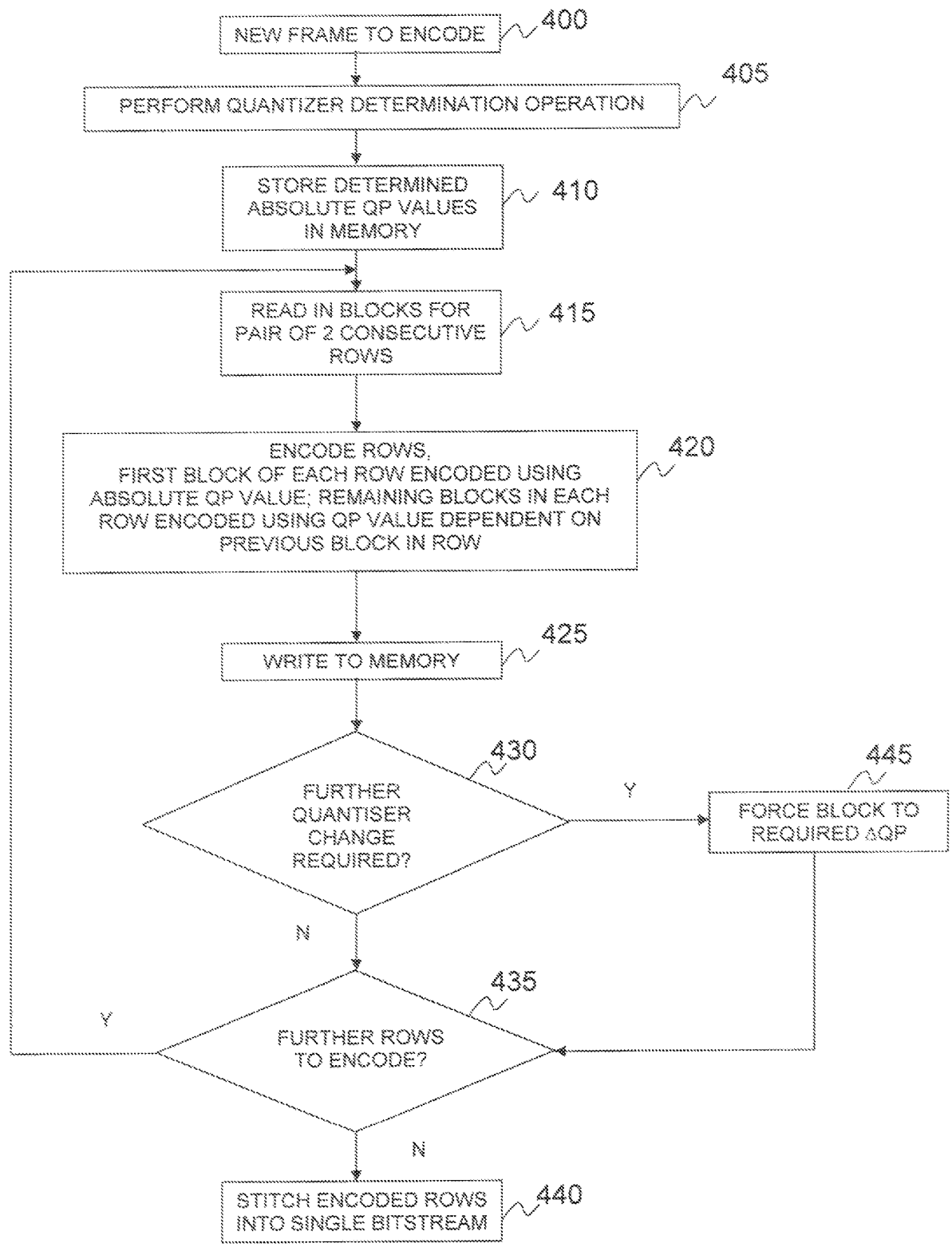
FIG. 5 schematically illustrates the steps taken by a video encoding apparatus in one embodiment of the technology described herein.

FIG. 5 schematically illustrates a series of steps performed by a video encoding apparatus according to one embodiment of the technology described herein.

At step 400 a new frame is available in the video image data buffer in memory to be encoded. In this embodiment the video encoding apparatus performs MPEG encoding and is configured to carry out a pre-processing operation in which the encoding parameter value determination operation determines the QP values to be used when encoding the first blocks in each row of the frame.

At step 405, the video encoding apparatus determines for each first block in each row of the frame an absolute quantization parameter QP value to be used for that blocks.

The QP value determination operation at step 405 may use any desired and suitable method for that process. For example, the QP value determination operation may involve reading in the left-hand column of blocks from the frame being encoded and determining a QP value to be used for each of the blocks based on the content of the blocks, e.g. based on the determined complexity of the blocks and a desired compression rate (or bandwidth). Alternatively the encoding parameter value determination operation may involve determining a QP value to be used for each of the blocks based on the content of the corresponding blocks in the previously encoded frame. In other embodiments, the encoding parameter value determination operation may involve determining QP values based on both the current blocks and the corresponding blocks in a previously encoded frame.

(A "base" QP value to be used at the start of the frame (a "slice QP" value that is encoded in a separate header) may also be determined, where required.)

The determined QP values are then stored in memory at step 410 for later use when encoding each of those blocks.

At step 415 the blocks in a pair of consecutive rows are read in and at step 420 these are encoded in parallel. The encoding at step 420 includes encoding the first blocks of each row using the corresponding QP value stored in memory and then encoding the remaining blocks in each row using a QP value dependent on the previous block. The encoded version of the second and subsequent blocks in each row will include (if necessary) a relative QP value defined with respect to the QP value of the preceding block. At step 425 the encoded data blocks are stored in an internal memory of the video encoding apparatus.

At step 430 it is determined, e.g. at a decision stage, whether a further quantization parameter value change is required (to ensure that the decoder will use the determined QP value for the first block of the second row of the pair of rows being encoded). This is done in this embodiment by determining whether the QP value for (indicated in) the last (encoded) block of data in the first row of the pair of rows will cause a decoder to derive the determined QP value for the first encoded block of data in the second row of the pair of rows, when using the relative QP value for (included in) the first (encoded) block of data in the second row to derive the QP value to be used when decoding the first block of data in the second row.

In this embodiment, this is done by summing both the QP value for (indicated in) the last (encoded) block of data in the first row and the relative QP value for (included in) the first (encoded) block of data in the second row. Of course, other arrangements are possible.

If the total is equal to the determined QP value for the first block of data in the second row, then it is clear that the decoder will derive the determined QP value for the first encoded block of data in the second row, and that no change of the QP value is required in order for the decoder to use the determined QP value for the first block of data in the second row when decoding the first block of data in the second row. In this case, the encoding apparatus simply proceeds to step 435.

At step 435 it is determined whether there are more rows in the frame that require encoding. If there are, then the flow returns to step 415. If there are no more rows to encode, then the flow proceeds to step 440 at which the encoded rows are combined (stitched) into a single bitstream, e.g. for transmission to a decoder or a storage element. (Note that step 440 is described separately here but in embodiments it is implemented as a process integrated into the pipeline behaviour of the video encoding apparatus, with the encoded rows being stitched together as soon as they are available.)

If it is determined at step 430 that the QP value for (indicated in) the last (encoded) block of data in the first row of the pair of rows will not cause a decoder to derive the determined QP value for the first encoded block of data in the second row of the pair of rows (e.g. because the sum of the QP value for (indicated in) the last (encoded) block of data in the first row and the relative QP value for (included in) the first (encoded) block of data in the second row is not equal to the determined QP value for the first block of data in the second row), the flow proceeds to step 445.

At step 445, the encoder forces an encoded block of data in the first row of the pair to indicate a QP value that will cause a decoder to derive the determined QP value for the first encoded block of data in the second row when using the relative QP value included in the first encoded block of data in the second row to derive the QP value to be used when decoding the first block of data in the second row.

In this example, this is achieved by modifying the relative QP value used for and indicated in the last encoded block of data in the first row to a value that will indicate a QP value for the block that when summed with the relative QP value included in the first encoded block of data in the second row, will give the determined QP value for the first encoded block of data in the second row.

This process can also include changing or modifying the encoded block type for the last encoded block of data in the first row from the encoded block type that would otherwise be used for that block of data (if it did not need to indicate a relative QP value to be used to derive the correct QP value to be used when decoding the first block of data in the second row), to a different encoded block type that facilitates the indication of a relative QP value in the encoded version of the last block of data in the first row.

For example, the encoding process, in order to facilitate a QP change in the decoder, may force a "skip" block to be "non-skipped" in order to indicate a QP value that will cause a decoder to use the determined QP value for the first block of row 2 when decoding the first block of row 2.

The process then proceeds to step 435.

Although in this example, steps 430 and 435 are performed after the pair of rows has finished being encoded, this is not required. In other embodiments, steps 430 and 435 are implemented as a process integrated into the encoding process itself (at step 420). Equally, steps 430 and 435 can be performed after the encoding of the entire frame has finished, e.g. as a post processing operation.

Also note that although FIG. 5 shows the encoding parameter value determination operation being performed at the beginning of the encoding process, i.e. before any of the rows of blocks are read in and encoded, it will be appreciated that this is not required. In alternative embodiments, the encoding parameter value determination operation may be performed on the fly, i.e., as and when the first blocks in the pair of two consecutive rows are read in at step 415. Additionally, whilst in this example pairs of two consecutive rows of blocks are read in and encoded, this need not be the case. In other embodiments the encoder may read in and encode any number of consecutive rows, depending on the number of encoding units available.

Figure 6:
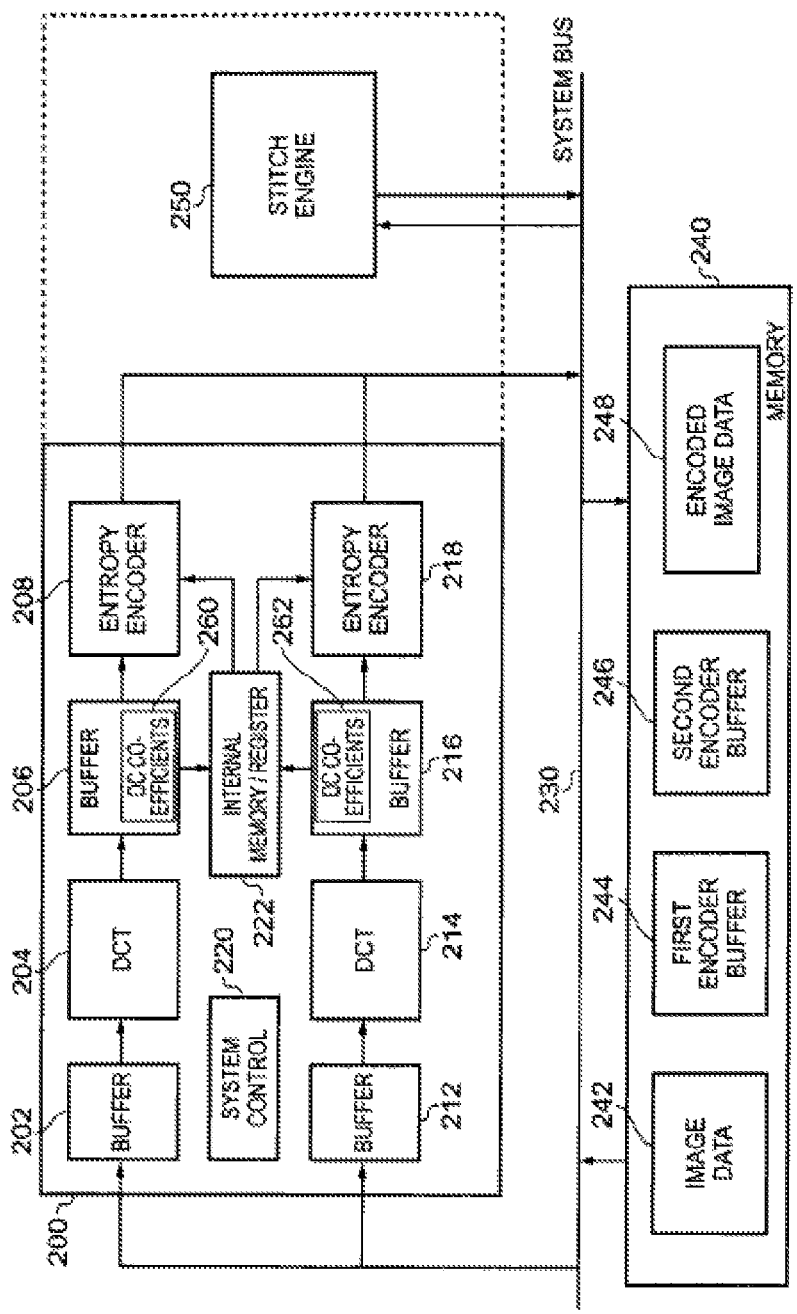
FIG. 6 schematically illustrates a video encoding apparatus according to one embodiment of the technology described herein.

FIG. 6 schematically illustrates a video encoding apparatus according to one embodiment. The video encoding apparatus 200 is configured to perform parallel MPEG encoding on two groups of unencoded blocks of pixels which it receives. The video encoding apparatus 200 comprises a first encoding unit and a second encoding unit. The first encoding unit is schematically represented by buffer 202, discrete cosine transform unit 204, buffer 206 and encoder 208. Similarly, the second encoding unit is schematically represented by buffer 212, discrete cosine transform unit 214, buffer 216 and encoder 218. It will be appreciated that each encoding unit is only illustrated at a schematic level for clarity of illustration, the person skilled in the art being familiar with the detailed configuration of a MPEG encoding unit. The video encoding apparatus 200 also comprises a system control unit 220 which coordinates the operation of the apparatus and an internal memory 222 which may be provided by a small RAM or one or more registers depending on the particular manner in which the video encoding apparatus is configured to be operated, as is discussed in more detail below.

The video encoding apparatus 200 is connected via a system bus 230 to a memory 240. The memory 240 contains a video image data buffer 242 in which a sequence of unencoded blocks of pixels is stored ready to be encoded by the video encoding apparatus 200. The video encoding apparatus 200 retrieves unencoded blocks of pixels from video image data buffer 242 and temporarily stores them in buffers 202 and 212. In one embodiment, the video encoding apparatus 200 is configured to encode video image data on a row-by-row basis and alternate rows of video image data to be encoded are stored in buffers 202 and 212 respectively. Each encoding unit is configured as a pipeline. Thus a block of pixels to be encoded is passed from buffer 202 into DCT unit 204; then the result of the DCT operation performed in DCT unit 204 is stored in buffer 206 for each block of pixels; whereafter encoding is performed by encoder 208. Each encoded block of pixels is generated by the first encoding unit (202; 204; 206; 208) on this block-by-block basis and is written to the first encoder buffer 244 in memory 240. A similar encoding process on a block-by-block basis is carried out by the second encoding unit (212; 214; 216; 218) and an encoded block of pixels generated by the second encoding unit is written into the second encoding buffer 246 in memory 240.

The output of the two encoding units stored in the first encoder buffer 244 and the second encoder buffer 246 are concatenated into a single consecutive bitstream by a stitch engine 250. Stitch engine 250 may form a part of the video encoding apparatus 200 as illustrated by the dashed line. The final single consecutive bitstream is then stored in the encoded video image data buffer 248 in memory 240.

Whilst the above examples have been described with reference to including a relative encoding parameter value in the encoded version of the first block of data for a given group (row), this need not be the case.

It is equally possible for the first block of data in a given group (row) of blocks of data to be encoded using an encoding type that does not support including a relative encoding parameter value in the encoded version of the data block, e.g. where the first block of data is encoded as a skip block.

However, as mentioned above, in such cases it is still ensured that an encoded block of data in the, e.g. immediately, preceding group indicates an encoding parameter value that will cause a decoder to derive the determined encoding parameter value for the first encoded block of data in the given group (when using the indicated encoding parameter value for the encoded block of data in the preceding group to determine the encoding parameter value to use for decoding the first block of data in the given group). For example, an encoded block of data in the immediately preceding group can be set to indicate the determined encoding parameter value for the first encoded block of data in the given group.

It can be seen from the above that the technology described herein, in its embodiments at least, provides a way of performing parallel encoding of two groups of blocks of pixels belonging to an image, whilst also facilitating the use of dynamic quantizer compression rates across the image.

This is achieved, in the embodiments of the technology described herein at least, by allocating pairs of first and second groups of pixel blocks of the image to separate encoding units, and performing an encoding parameter value determination operation on the first block of at least the second group of each pair to determine a quantization parameter value to be used for the first block of that second group of pixel blocks. For correct reconstruction of the image, it is ensured that a block belonging to the first group of pixel blocks of the pair is encoded with a QP value that will ensure that a decoder will use the determined QP value when decoding the first block of the second group.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of encoding video image data comprising encoding a sequence of unencoded blocks of the video image data into a sequence of encoded blocks of data in a video encoding format, wherein:
   the video encoding format uses an encoding parameter when encoding unencoded blocks of data;
   the method comprising, for at least one pair of a first and a second group of unencoded blocks of data of the sequence of unencoded blocks of data, the first and second groups comprising contiguous blocks of data in the bitstream order of the video image data, the first block of the second group following the last block of the first group in the bitstream order:
   encoding the first and second groups of unencoded blocks of data to generate a first group and a second group of encoded blocks of data, respectively;
   wherein the encoding of the first and second group of unencoded blocks of data comprises:
   selecting, for each unencoded block of data, a respective first block encoding type having a first set of syntax elements to be used to encode the block of data;
   determining a value of the encoding parameter to be used for encoding an unencoded block of data in the second group, before the encoding of all of the blocks of data in the first group has finished;
   encoding the unencoded block of data in the second group using the determined encoding parameter value;
   determining the encoding parameter value that causes a decoder to derive the determined encoding parameter value for the encoded block of data in the second group when decoding the block of data in the second group;

setting a block of data in the first group to store indicate the determined encoding parameter value that causes a decoder to derive the determined encoding parameter value for the encoded block of data in the second group when decoding the block of data in the second group;

wherein setting a block of data in the first group to store indicate the determined encoding parameter value that causes a decoder to derive the determined encoding parameter value for the encoded block of data in the second group when decoding the block of data in the second group comprises:

determining whether the first set of syntax elements used by the first block encoding type selected to be used to encode the block of data in the first group comprises a syntax element that supports storing indicating in the encoded version of the block of data in the first group the determined encoding parameter value that causes a decoder to derive the determined encoding parameter value for the encoded block of data in the second group when decoding the block of data in the second group; and when it is determined that the first set of syntax elements used by the first block encoding type selected to be used to encode the block of data in the first group does not comprise a syntax element that supports indicating in the encoded version of the block of data in the first group the determined encoding parameter value that causes a decoder to derive the determined encoding parameter value for the encoded block of data in the second group when decoding the block of data in the second group;

selecting a second, different block encoding type having a second, different set of syntax elements to the selected first block encoding type to be used to encode the block of data in the first group, wherein the second, different set of syntax elements used by the second, different block encoding type comprises a syntax element that does support indicating in the encoded version of the block of data in the first group the determined encoding parameter value that causes a decoder to derive the determined encoding parameter value for the encoded block of data in the second group when decoding the block of data in the second group; and encoding the block of data in the first group using the selected second, different block encoding type.

2. The method of claim 1, wherein the sequence of unencoded blocks of data is divided into and processed as plural pairs of first and second groups of unencoded blocks of data.

3. The method of claim 2, wherein the encoding parameter value is determined for the first block of data in each group of unencoded blocks of data.

4. The method of claim 1, comprising for a pair of a first and a second group of unencoded blocks of data, encoding the first group and the second group of unencoded blocks of data of the pair, at least in part, in parallel.

5. The method of claim 1, further comprising:
indicating in the first encoded block of data in the second group a relative encoding parameter value defined with respect to the encoding parameter of the preceding block to be used by a decoder to determine the encoding parameter value to use for decoding the first block of data in the second group; and wherein:
determining the encoding parameter value that causes a decoder to derive the determined encoding parameter value for the encoded block of data in the second group when decoding the block of data in the second group comprises:
determining the relative encoding parameter value that causes a decoder to derive the determined encoding parameter value for the encoded block of data in the second group when decoding the block of data in the second group; and
setting a block of data in the first group to indicate the determined encoding parameter value that causes a decoder to derive the determined encoding parameter value for the encoded block of data in the second group when decoding the block of data in the second group comprises:
setting a block of data in the first group to indicate the determined relative encoding parameter value that causes a decoder to derive the determined encoding parameter value for the encoded block of data in the second group when decoding the block of data in the second group.

6. The method of claim 1, wherein setting a block of data in the first group to indicate the determined encoding parameter value that causes a decoder to derive the determined encoding parameter value for the encoded block of data in the second group when decoding the block of data in the second group comprises:
determining whether the encoding parameter value that the encoder would have chosen for the block of data in the first group will cause the decoder to derive the determined encoding parameter value for the encoded block of data in the second group of the pair of groups when determining the encoding parameter value to use for decoding the block of data in the second group; and
when it is determined that the encoding parameter value that the encoder would have chosen for the block of data in the first group will not cause the decoder to derive the determined encoding parameter value for the encoded block of data in the second group of the pair of groups when determining the encoding parameter value to use for decoding the block of data in the second group, modifying the encoding parameter value for the block of data in the first group to the determined encoding parameter value for the block that causes a decoder to derive the determined encoding parameter value for the encoded block of data in the second group when decoding the block of data in the second group.

7. A method of encoding video image data comprising a sequence of unencoded blocks of data into a sequence of encoded blocks of data in a video encoding format, the method comprising:
determining, for each unencoded block of data, a respective first block encoding type having a first set of syntax elements to be used to encode the block of data;
for at least one block of data in the sequence:
selecting a second, different block encoding type having a second, different set of syntax elements to the determined first block encoding type to be used to encode the block of data in order to be able to include in the generated corresponding encoded block of data information that is to be conveyed to a decoder, wherein the second, different set of syntax elements used by the second, different block encoding type comprises a syntax element that supports including in the generated corresponding encoded block of data information that is to be conveyed to a decoder; and
once the second, different block encoding type has been selected, encoding the unencoded block of data to generate the corresponding encoded block of data using the second, different block encoding type in order to include in the generated corresponding encoded block of data the information that is to be conveyed to a decoder.

8. The method of claim 1, comprising:

changing the first block encoding type to be used to encode a block of data from being a skip block encoding type to being a non-skip block encoding type in order to include in the encoded block of data information that is to be conveyed to a decoder.

9. The method of claim 1, wherein:

the encoding parameter is a quantization parameter.

10. An apparatus for encoding video image data, wherein encoding video image data comprises encoding a sequence of unencoded blocks of the video image data into a sequence of encoded blocks of data in a video encoding format, wherein:

the video encoding format uses an encoding parameter when encoding unencoded blocks of data;

the apparatus for encoding video image data comprising processing circuitry configured to, for at least one pair of a first and a second group of unencoded blocks of data of the sequence of unencoded blocks of data, the first and second groups comprising contiguous blocks of data in the bitstream order of the video image data, the first block of the second group following the last block of the first group in the bitstream order:

encode the first and second groups of unencoded blocks of data to generate a first group and a second group of encoded blocks of data, respectively;

wherein the encoding of the first and second group of unencoded blocks of data comprises:

selecting, for each unencoded block of data, a respective first block encoding type having a first set of syntax elements to be used to encode the block of data;

determining a value of the encoding parameter to be used for encoding an unencoded block of data in the second group, before the encoding of all of the blocks of data in the first group has finished;

encoding the unencoded block of data in the second group using the determined encoding parameter value;

determining the encoding parameter value that causes a decoder to derive the determined encoding parameter value for the encoded block of data in the second group when decoding the block of data in the second group; and setting a block of data in the first group to indicate the determined encoding parameter value that causes a decoder to derive the determined encoding parameter value for the encoded block of data in the second group when decoding the block of data in the second group;

wherein setting a block of data in the first group to indicate the determined encoding parameter value that causes a decoder to derive the determined encoding parameter value for the encoded block of data in the second group when decoding the block of data in the second group comprises:

determining whether the first set of syntax elements used by the first block encoding type selected to be used to encode the block of data comprises a syntax element that supports indicating in the encoded version of the block of data in the first group the value of the determined encoding parameter that causes a decoder to derive the determined encoding parameter value for the encoded block of data in the second group when decoding the block of data in the second group; and when it is determined that the first set of syntax elements used by the first block encoding type selected to be used to encode the block of data in the first group does not comprise a syntax element that supports indicating in the encoded version of the block of data in the first group the determined encoding parameter value that causes a decoder to derive the determined encoding parameter value for the encoded block of data in the second group when decoding the block of data in the second group;

selecting a second, different block encoding type having a second, different set of syntax elements to the selected first block encoding type to be used to encode the block of data in the first group, wherein the second, different set of syntax elements used by the second, different block encoding type comprises a syntax element that does support indicating in the encoded version of the block of data in the first group the determined encoding parameter value that causes a decoder to derive the determined encoding parameter value for the encoded block of data in the second group when decoding the block of data in the second group; and encoding the block of data in the first group using the selected second, different block encoding type.

11. The apparatus of claim 10, wherein the processing circuitry is configured to divide and process the sequence of unencoded blocks of data as plural pairs of first and second groups of unencoded blocks of data.

12. The apparatus of claim 10, wherein the encoding of the first and second group of unencoded blocks of data comprises:

for a given pair of a first and a second group of unencoded blocks of data, encoding the first group and the second group of unencoded blocks of data of the pair, at least in part, in parallel.

13. The apparatus of claim 10, wherein:

the encoding of the first and second group of unencoded blocks of data comprises indicating in the first encoded block of data in the second group a relative encoding parameter value defined with respect to the encoding parameter of the preceding block to be used by a decoder to determine the encoding parameter value to use for decoding the first block of data in the second group; and wherein:

determining the encoding parameter value that causes a decoder to derive the determined encoding parameter value for the encoded block of data in the second group when decoding the block of data in the second group comprises:

determining the relative encoding parameter value that causes a decoder to derive the determined encoding parameter value for the encoded block of data in the second group when decoding the block of data in the second group; and setting a block of data in the first group to indicate the determined encoding parameter value that causes a decoder to derive the determined encoding parameter value for the encoded block of data in the second group when decoding the block of data in the second group comprises:

setting a block of data in the first group to indicate the determined relative encoding parameter value that causes a decoder to derive the determined encoding parameter value for the encoded block of data in the second group when decoding the block of data in the second group.

14. The apparatus of claim 10, wherein setting a block of data in the first group to indicate the determined encoding parameter value that causes a decoder to derive the determined encoding parameter value for the encoded block of data in the second group when decoding the block of data in the second group comprises:
   determining whether the encoding parameter value that the encoder would have chosen for the block of data in the first group will cause the decoder to derive the determined encoding parameter value for the encoded block of data in the second group of the pair of groups when determining the encoding parameter value to use for decoding the block of data in the second group; and
   when it is determined that the encoding parameter value that the encoder would have chosen for the block of data in the first group will not cause the decoder to derive the determined encoding parameter value for the encoded block of data in the second group of the pair of groups when determining the encoding parameter value to use for decoding the block of data in the second group, modifying the encoding parameter value for the block of data in the first group to the determined encoding parameter value that causes a decoder to derive the determined encoding parameter value for the encoded block of data in the second group when decoding the block of data in the second group for the block.

15. An apparatus for encoding video image data comprising a sequence of unencoded blocks of data into a sequence of encoded blocks of data in a video encoding format, the apparatus comprising processing circuitry that is capable of:
   determining, for each unencoded block of data, a respective first block encoding type having a first set of syntax elements to be used to encode the block of data;
   for at least one block of data in the sequence:
   selecting a second, different block encoding type having a second, different set of syntax elements to the determined first block encoding type to be used to encode a block of data in the sequence in order to store include in the generated corresponding encoded block of data information that is to be conveyed to a decoder, wherein the second, different set of syntax elements used by the second, different block encoding type comprises a syntax element that supports including in the generated corresponding encoded block of data information that is to be conveyed to a decoder; and
   once the second, different block encoding type has been selected, encoding the unencoded block of data to generate the corresponding encoded block of data using the second, different block encoding type in order to include in the generated corresponding encoded block of data the information that is to be conveyed to a decoder.

16. The apparatus of claim 15, wherein the processing circuitry is capable of:
   changing the first block encoding type to be used to encode a block of data from being a skip block encoding type to being a non-skip block encoding type in order to include in the encoded block of data information that is to be conveyed to a decoder.

17. A non-transitory computer readable storage medium storing computer software code which when executing on at least one processor performs a method of encoding video image data comprising encoding a sequence of unencoded blocks of the video image data into a sequence of encoded blocks of data in a video encoding format, wherein:

the video encoding format uses an encoding parameter when encoding unencoded blocks of data;
the method comprising, for at least one pair of a first and a second group of unencoded blocks of data of the sequence of unencoded blocks of data, the first and second groups comprising contiguous blocks of data in the bitstream order of the video image data, the first block of the second group following the last block of the first group in the bitstream order:
encoding the first and second groups of unencoded blocks of data to generate a first group and a second group of encoded blocks of data, respectively;
wherein the encoding of the first and second group of unencoded blocks of data comprises:
selecting, for each unencoded block of data, a respective first block encoding type having a first set of syntax elements to be used to encode the block of data;
determining a value of the encoding parameter to be used for encoding an unencoded block of data in the second group, before the encoding of all of the blocks of data in the first group has finished;
encoding the unencoded block of data in the second group using the determined encoding parameter value;
determining the encoding parameter value that causes a decoder to derive the determined encoding parameter value for the encoded block of data in the second group when decoding the block of data in the second group;
setting a block of data in the first group to indicate the determined encoding parameter value that causes a decoder to derive the determined encoding parameter value for the encoded block of data in the second group when decoding the block of data in the second group;
wherein setting a block of data in the first group to indicate the determined encoding parameter value that causes a decoder to derive the determined encoding parameter value for the encoded block of data in the second group when decoding the block of data in the second group comprises:
determining whether the first set of syntax elements used by the first block encoding type selected to be used to encode the block of data in the first group comprises a syntax element that supports indicating in the encoded version of the block of data in the first group the determined encoding parameter value that causes a decoder to derive the determined encoding parameter value for the encoded block of data in the second group when decoding the block of data in the second group; and
when it is determined that the first set of syntax elements used by the first block encoding type selected to be used to encode the block of data in the first group does not comprise a syntax element that supports indicating in the encoded version of the block of data in the first group the determined encoding parameter value that causes a decoder to derive the determined encoding parameter value for the encoded block of data in the second group when decoding the block of data in the second group:
selecting a second, different block encoding type having a second, different set of syntax elements to the selected first block encoding type to be used to encode the block of data in the first group, wherein the second, different set of syntax elements used by the second, different block encoding type comprises a syntax element that does support indicating in the encoded version of the block of data in the first group the determined encoding parameter value that causes a decoder to derive the determined encoding parameter value for the encoded block of data in the second group when decoding the block of data in the second group; and encoding the block of data in the first group using the selected second, different block encoding type.

18. A non-transitory computer readable storage medium storing computer software code which when executing on at least one processor performs a method of encoding video image data comprising a sequence of unencoded blocks of data into a sequence of encoded blocks of data in a video encoding format, the method comprising:

determining, for each unencoded block of data, a respective first block encoding type having a first set of syntax elements to be used to encode the block of data;

for at least one block of data in the sequence:

selecting a second, different block encoding type having a second, different set of syntax elements to the determined first block encoding type to be used to encode the block of data in order to be able to include in the generated corresponding encoded block of data information that is to be conveyed to a decoder, wherein the second, different set of syntax elements used by the second, different block encoding type comprises a syntax element that supports including in the generated corresponding encoded block of data information that is to be conveyed to a decoder; and once the second, different block encoding type has been selected, encoding the unencoded block of data to generate the corresponding encoded block of data using the second, different block encoding type in order to include in the generated corresponding encoded block of data the information that is to be conveyed to a decoder.

* * * * *

UNITED STATES PATENT AND TRADEMARK OFFICE
CERTIFICATE OF CORRECTION

PATENT NO. : 10,791,332 B2
APPLICATION NO. : 14/949651
DATED : September 29, 2020
INVENTOR(S) : R. Döffinger et al.

Page 1 of 1

It is certified that error appears in the above-identified patent and that said Letters Patent is hereby corrected as shown below:

In the Claims

Column 29, Line 1 (Claim 1, Line 32), please change "to store" to -- to --.

Column 29, Line 6 (Claim 1, Line 37), please change "to store" to -- to --.

Column 29, Line 15 (Claim 1, Line 46), please change "supports storing" to -- supports --.

Column 29, Line 32 (Claim 1, Line 62), please change "group;" to -- group: --.

Column 32, Line 10 (Claim 10, Line 64), please change "group;" to -- group: --.

Column 33, Line 40 (Claim 15, Line 12), please change "to store" to -- to --.

Signed and Sealed this
Twenty-second Day of December, 2020

Andrei Iancu
*Director of the United States Patent and Trademark Office*